United States Patent [19]

Gsponer et al.

[11] 4,284,369
[45] Aug. 18, 1981

[54] TAKE-UP HEAD FOR BULK MATERIAL CONVEYOR INSTALLATION

[75] Inventors: Arnold Gsponer, Brunswick, Fed. Rep. of Germany; Hans Schnitzer, Winterthur, Switzerland

[73] Assignee: Gebrueder Buehler AG, Uzwil, Switzerland

[21] Appl. No.: 932,361

[22] Filed: Aug. 9, 1978

Related U.S. Application Data

[63] Continuation of Ser. No. 699,992, Jun. 25, 1976, abandoned.

[30] Foreign Application Priority Data

Jun. 26, 1975 [CH] Switzerland ............... 8249/75

[51] Int. Cl.³ .......................................... B65G 65/28
[52] U.S. Cl. .......................................... 406/52; 37/189;
198/511; 198/518; 198/519; 406/152; 414/139;
414/140; 414/313; 414/133; 414/786
[58] Field of Search ............... 198/506, 510, 511, 518,
198/519; 37/189; 406/52, 151, 152; 414/786,
137, 133, 138, 139, 317, 140, 145, 313

[56] References Cited

U.S. PATENT DOCUMENTS

| 3,616,890 | 11/1971 | Pradon | 214/10 X |
| 3,884,528 | 5/1975 | Shaddock | 214/14 X |
| 3,926,301 | 12/1975 | Herms | 214/14 X |
| 3,968,998 | 7/1976 | Wolf | 214/17 DB X |

FOREIGN PATENT DOCUMENTS

| 272964 | 7/1969 | Austria | 214/17 DB |
| 606646 | 12/1934 | Fed. Rep. of Germany | 214/17 DB |
| 118055 | 8/1918 | United Kingdom | 214/17 DB |

Primary Examiner—Frank E. Werner
Attorney, Agent, or Firm—Merchant, Gould, Smith, Edell, Welter & Schmidt

[57] ABSTRACT

The disclosure is directed to a take-up head for a conveyor installation that removes bulk material from the hold of a ship. The take-up head includes a vertical conveying tube carried by a frame, the lower end of the tube defining a take-up aperture. A rotary feeder having a plurality of radially extending spiral veins is rotatably driven to drive material inwardly to the take-up aperture. A holding device, which takes various forms in the several embodiments, projects downward in coaxial relation relative to the feeder to engage the bulk material and resist lateral movement of the take-up head. Anchoring apparatus, which takes the form of a plurality of laterally extending pivotal arms or a laterally extending auxiliary conveyor, is constructed for lowering into engagement with the material to resist rotation of the frame as the feeder rotates. The take-up head is suspended from an on-shore jib that moves the head to various positions within the ship's hold to remove all bulk material.

17 Claims, 8 Drawing Figures

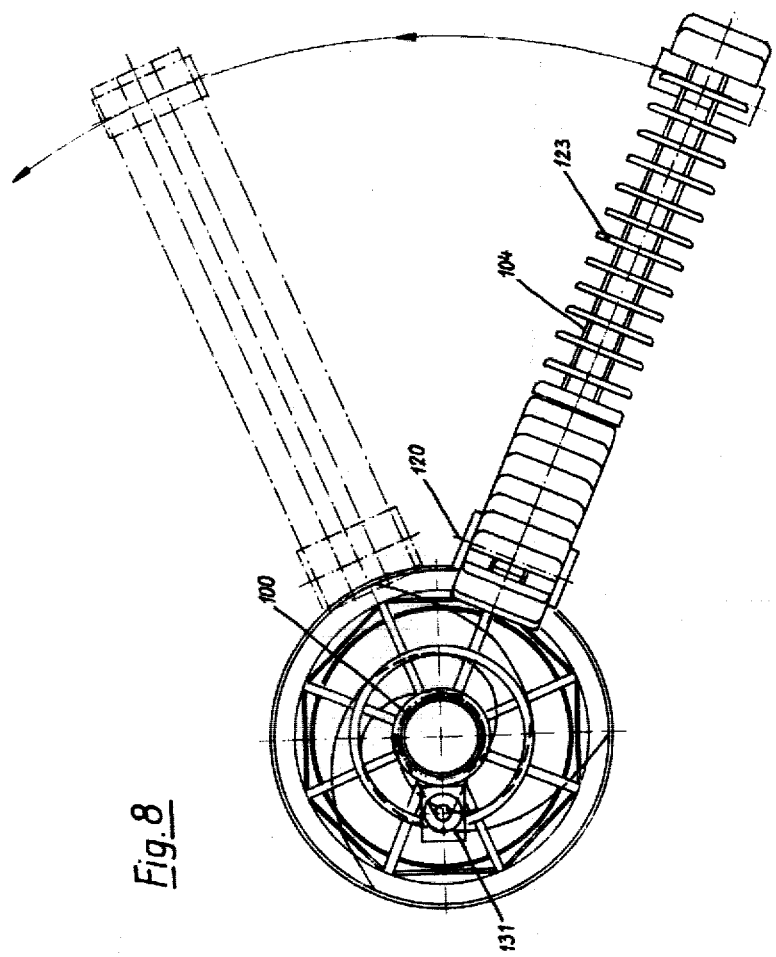

TAKE-UP HEAD FOR BULK MATERIAL CONVEYOR INSTALLATION

This is a continuation of application Ser. No. 699,992, filed June 25, 1976, now abandoned.

The invention relates to a take-up head for a bulk material conveyor installation, the head having a take-up aperture for upward conveyance of bulk material and a rotary feeder around the take-up aperture to feed the material inwardly towards that aperture. Such take-up heads are used particularly (though not exclusively) in ship unloading installations employing a pneumatic conveying pipe or a chain conveyor for lifing bulk material out of a ship's hold.

It is known that the action of moisture and pressure makes many bulk materials lose their easy flow properties when they spend a relatively long period of time in the hold of a ship, and they form such a compact mass that strong mechanical forces are required to loosen them for offloading.

Ships and the bulk materials in them are at times subjected to considerable movements because of the motion of the water. This leads to substantial technical difficulty during offloading if the offloading installation is fixed on shore and the take-up head has to carry out specific movements and apply mechanical force for loosening, conveying and taking up the bulk material independently of relative movements between ship and offloading installation.

One known solution utilizing a rotary feeder around the take-up aperture does not allow systematic unloading. With greatly compressed material there is a tendency to drill holes in the bed of bulk material in honeycomb fashion so that thin "walls" of bulk material are left standing several meters in height. These walls have to be broken up in order to allow the bulk material to be brought to the take-up head. It would be possible to force the take-up head to carry out desired movements with a rope system, but in many cases this is very cumbersome.

The invention has aimed at developing an apparatus which in at least some of its forms can be introduced through small openings such as the hatches on a ship, and can loosen mechanically and take up the bulk material without the use of rope systems and the like.

Bulk materials such as wheat flow freely to the suction nozzle of a pneumatic conveyor where they are taken up and transported away, and the method of operation is straightforward. However, bulk materials with poor flow properties must initially be loosened and fed to the suction nozzle so that the desired conveying output can be maintained.

The same applies to ship unloading installations using chain conveyors.

In material transfer work with high delivery rates (for example, 100 tons per hour and above per conveying unit), dragline crawler apparatus and other means known in the construction industry are used in order to bring the bulk material to the take-up head of the unloading installation.

In recent times, the same object has been achieved by providing a special scraper conveyor which is moved and controlled in conjunction with the unloading installation. Thus, in a very economical manner large quantities can be transferred in a very short time without dust nuisance and without risk of accident to the operators. Relative movements between ship and shore is taken up by special construction of the entire unloading installation. But in many cases it has not been possible to utilize these measures in small installations while keeping within economical limits.

It has been found disadvantageous on many occasions that ship unloading installations in the medium and relatively small conveying capacity range of possibly up to a few hundred tons per hour, and particularly with products which have difficult flow properties or are tightly compacted, could only be used at the intended capacity rate with the use of feed scoops and other aids. Therefore, part of the objective has been to develop an apparatus which in at least some of its forms is suitable for relatively small and medium unloading installations wherein an optimum material removal technique would be possible in accordance with particular conditions such as the size of the ship, the type and condition of the product, etc.; so that, for example, one horizontal layer of bulk material after the other can be taken away without requiring expensive force-transmitting and anti-overloading systems.

Accordingly in one of its aspects the invention provides a take-up head for a bulk material conveyor installation, the head having a take-up aperture for upward conveyance of bulk material, a standing part, a rotary feeder at the take-up aperture and a drive for rotating the feeder relative to the standing part for inward feed of material to the take-up aperture, at least one anchorage member of which at least part can be raised and lowered and which extends outwardly with respect to the take-up aperture, and a downwardly projecting hold member coaxial with the rotary feeder, the arrangement being such that in use of the head the hold member can engage in the underlying bulk material thereby to help hold the head against lateral movement and the anchorage member can engage in the bulk material remote from the rotary member thereby to help anchor the standing part against rotation. Preferably the rotary feeder includes spiral vanes extending spirally outward as seen in plan of the feeder and arranged for inward feed of material to the take-up aperture. The or each anchorage member preferably extends radially with respect to the standing part, and is preferably pivotally secured to the standing part so that it can be raised and lowered with respect thereto.

In one preferred form of the invention, a plurality of anchorage members are provided each being a radially extending pivotable arm pivotally attached to the standing part and preferably having a blade at its remote end region to facilitate anchorage in the bulk material.

In an alternative preferred form the anchorage member is itself an auxiliary conveyor extending radially from the standing part. In the course of conveying loosened material to the take-up aperture the auxiliary conveyor can work its way into the bulk material and hence provide anchorage therein.

In forms of the invention in which the take-up aperture leads into a pneumatic conveyor pipe, the hold member may be fast with the rotary feeder so as to rotate therewith.

On the other hand, in forms of the invention cooperating with a chain conveyor, the take-up head may include a reversal station for the chain conveyor, the reversal station having at least one lateral take-up aperture and being open underneath whereby cross bars of the conveyor chain while extending underneath constitute the hold member.

For ship unloading installations and pneumatic conveying pipe preferably comprises per se known telescopically mobile intermediate elements and the ship chain conveyor comprises special joints so that in both cases movements of ships can be absorbed and are not transmitted to structural parts of the ship unloading installation connected to dry land.

According to another of its aspects the invention provides a method of taking up bulk material into a conveyor which includes the steps of lowering onto the bulk material a take-up head having a take-up aperture, rotating a feeder around the take-up aperture for inward feed of material to that aperture, causing a downwardly projecting hold member co-axial with the feed member to engage in the underlying bulk material to help hold the head against lateral movement and causing an anchorage member extending outwardly with respect to the take-up aperture to engage in the bulk material remote from the rotary member to help anchor against rotation a standing part from which the rotary feeder is rotated. For unloading bulk material from the hold of a ship the method preferably includes the step of moving the take-up head laterally from time to time by appropriate movement of a land based jib from which the take-up head is suspended thereby to take up increasing parts of a layer of bulk material from the hold, and preferably also the step of lowering the take-up head further by appropriate movement with respect to a land based jib after the take-up head has taken up a layer of material and then causing it to take up a subjacent layer.

According to yet another of its aspects the invention provides a take-up head for a bulk material conveyor installation, the head having a take-up aperture for upward conveyance of bulk material, a standing part, a feeder at the take-up aperture for inward feed of material to the take-up aperture and an auxiliary conveyor which extends outwardly with respect to the take-up aperture and which can be raised and lowered and be rotated with respect to the take-up aperture, and which has a raised transfer end proximate the take-up aperture for delivery of material into the feeder from above the drive means for rotation of the auxiliary conveyor relative to the standing part. This form of take-up head may of course be used in conjunction with the features described in relation to other aspects of the invention.

BRIEF DESCRIPTION OF THE DRAWINGS

For a better understanding of the invention three embodiments thereof will now be described with reference to the accompanying drawings in which:

FIG. 8 is a section taken along the line VIII—VIII of FIG. 7.

DESCRIPTION OF THE PREFERRED EMBODIMENTS

Figure 1:
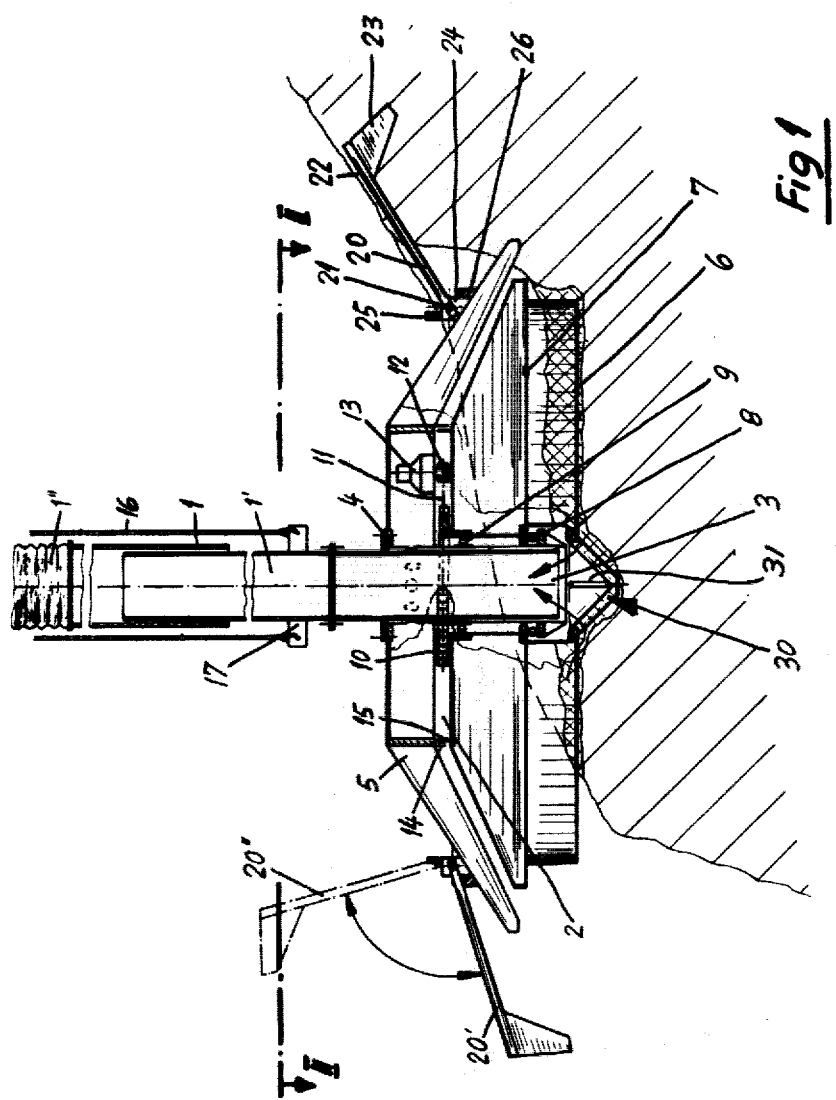
FIG. 1 shows partly in elevation and in section the take-up head of a pneumatic conveying pipe of a first embodiment.

FIG. 1 shows the first embodiment of the invention with a pneumatic conveying pipe 1. A lower telescopic pipe 1' can be slid into the conveying pipe 1. The conveying pipe 1 also comprises an elastic or flexible intermediate element 1'' which allows for substantial horizontal swivelling movement of the take-up head 2. The telescopic pipe 1' ends in the lower region of the take-up head 2 with a take-up aperture 3. By means of a flange 4 a standing or stationary part in the form of a frame 5 is connected rigidly to the telescopic pipe 1' to act as a protective frame or guard. In and below the protective frame 5 is mounted a rotary feeder in the form of a rotary plate 7 provided with feed spirals 6. The rotary plate 7 is mounted by means of a lower axial bearing 8 and an upper radial bearing 9 so as to be capable of rotational movement on the telescopic pipe 1'. The rotary plate 7 also has a toothed driving wheel 10 in the upper region which can be rotated by a chain 11 engaging a toothed wheel 12 driven by a drive motor 13. The protective frame 5 also comprises a covering ring 14 which together with a second protective ring 15 situated on the rotary plate 7 prevents product from readily gaining access to the region of the drive. The entire take-up head can be lifted and lowered by ropes 16 which are secured on a strap 17 of the telescopic pipe 1'. The lifing and lowering apparatus (not shown) can be adapted to suit the particular requirements in each case. Anchorage members in the form of pivotable arms 20 are connected pivotably to the protective frame 5 in each case by a pivot pin 21 extending horizontally. Each pivotable arm 20 consists of an extension bar 22 and a blade 23. Supports 24 for the pivotable arms 20 are secured to the protective frame 5, each having an upper abutment 25 and a lower abutment 26.

The pivotable arm 20 is shown in an upper working position at the right-hand side of the illustration. The blade 23 has sunk into the product. At the left-hand side the pivotable arm 20' is shown in the lowest end position and the pivotable arm 20'' shown in dot-dash lines is shown in the uppermost end position. In this constructional form the pivotable arm 20 can move freely within an angle to about 90°.

Figure 2:
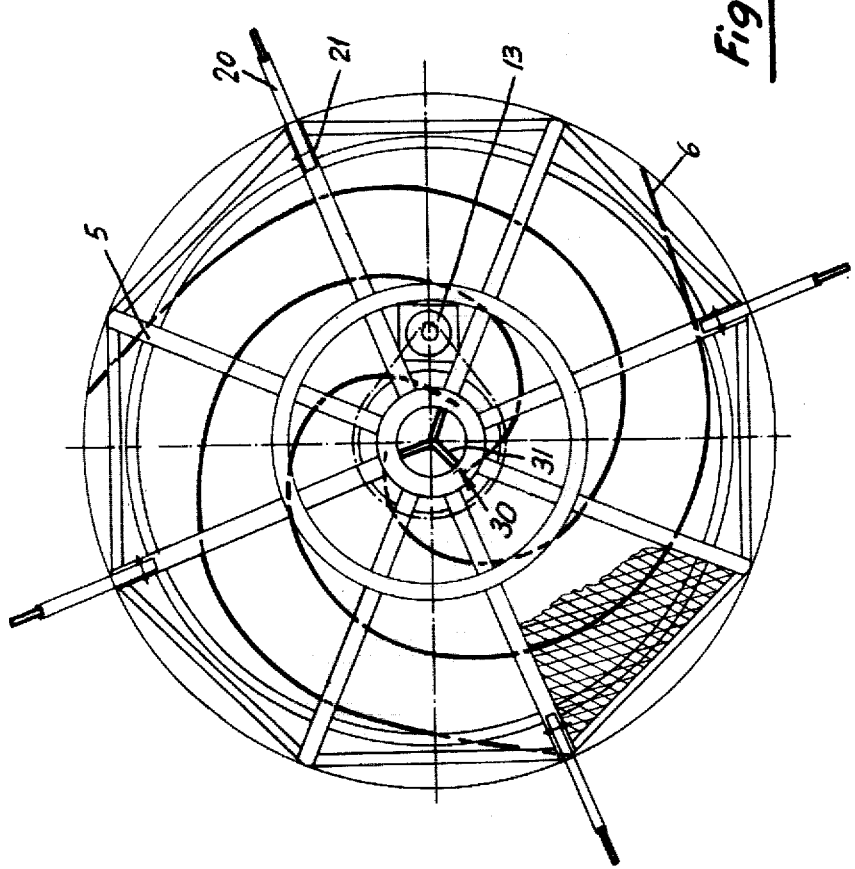
FIG. 2 is a section taken along line II—II of FIG. 1.
Figure 3:
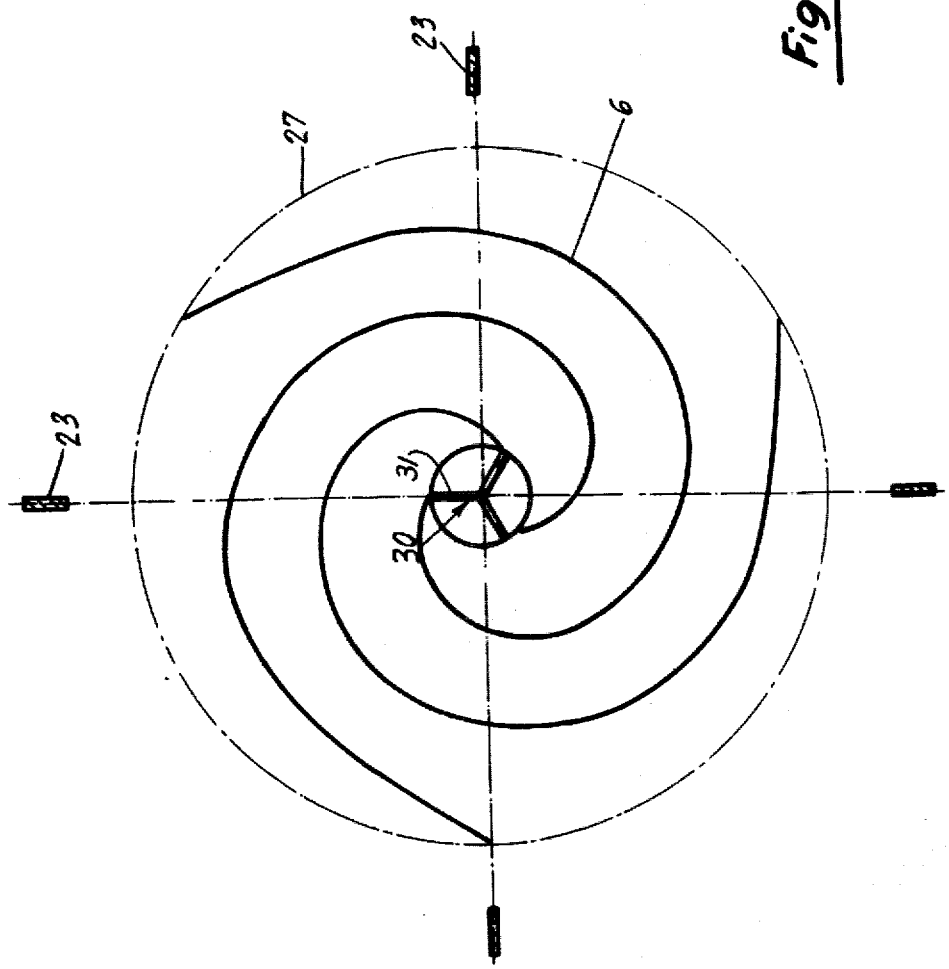
FIG. 3 illustrates the arrangement of the feed spiral, the loosening and centering tip and the pivotable arms of the embodiment of FIGS. 1 and 2.

As shown by FIGS. 2 and 3 the feed spiral 6 is an assembly of three separate spiral vanes. Three or more spirals have the advantage of more uniform and steadier running than two spirals or even only one spiral. Four pivotable arms 20 are provided outside the working region of the feed spiral assembly 6 on the protective frame 5.

FIG. 3 also shows diagrammatically a hold member in the form of a tip 30 here consisting of a three-pronged tip which (as shown in FIG. 1) projects beyond the feed spiral into the bulk material. The tip 30 is made from simple flat sections and connected directly to the feed spiral 6.

The pivotable arms 20 prevent rotation of the stationary protective frame 5 and therefore of the telescopic tube 1' since at least one of the pivotable arms 20 is in contact with the bulk material. The conveying pipe 1 together with the protective frame 5 and the pivotable arms 20 are intended normally to carry out only an upwardly or downwardly directed movement. However, the tip 30 preferably carries out a rotary movement with the rotary plate 7. The resistance presented by the bulk material to the rotary movement of the feed spiral, or in other words the reaction forces, are transmitted directly by way of the driving wheel 10, the chain 11, the toothed wheel 12 and drive motor 13 to the protective frame 5, and then taken by the pivotable arms 20 in the bulk material itself. The tip 30 is formed of three upright flat sections 31 which are brought together and connected to the feed spiral 6.

The embodiment shown in FIGS. 1 to 3 operates as follows.

Figure 6:
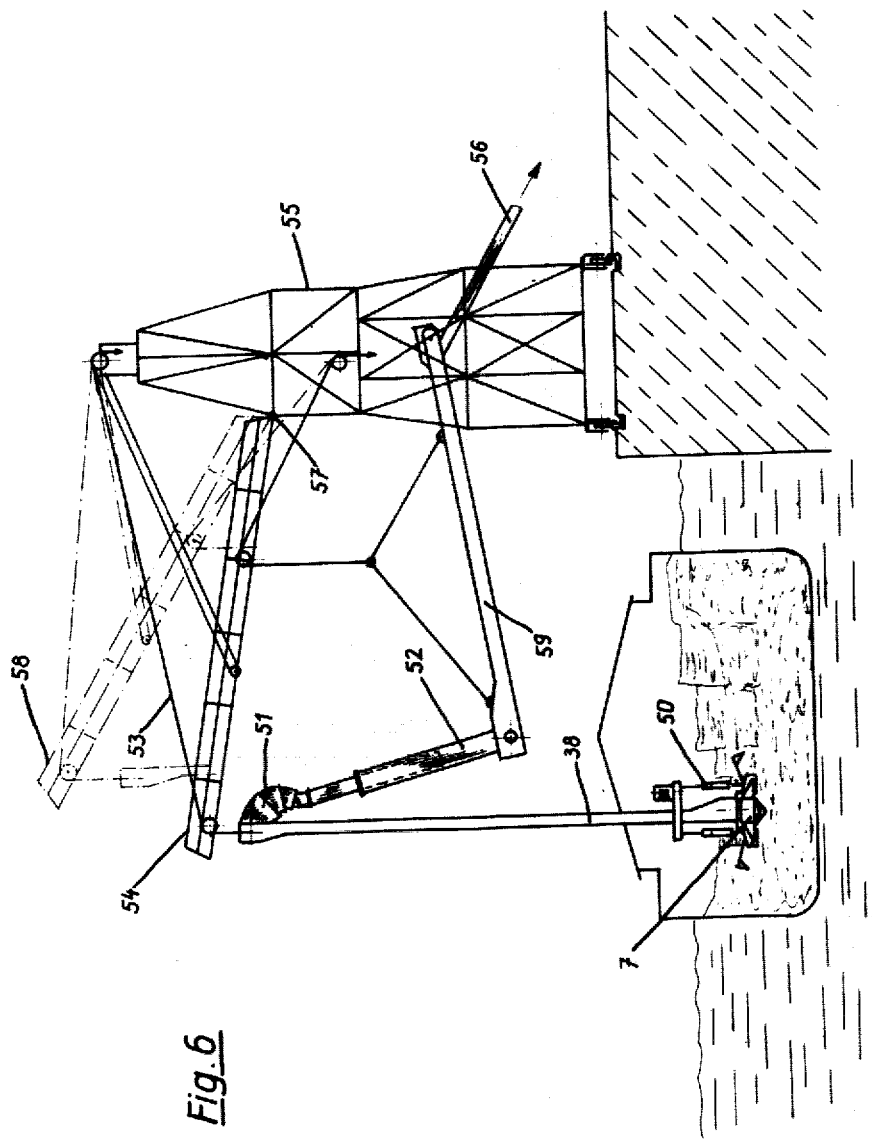
FIG. 6 illustrates diagrammatically a complete unloading installation that includes the embodiment of FIGS. 4 and 5.

The conveying pipe 1 and therefore the entire take-up head 2 with the telescopic pipe 1' is suspended on a support structure constructed somewhat as shown in FIG. 6, and can be brought to any desired point in the predetermined working range and lowered onto the bulk material. It is not important whether the tip 30, the feed spiral 6 or the pivotable arms 20 happen to contact the bulk material first, since small heaps of bulk material present only small resistance. But it is very important that at least one of the pivotable arms 20 and the tip 30 come into contact with the bulk material before the actual loosening and feeding work is carried out by the feed spiral 6. The large reaction moments usually occur only once the feed spiral 6 begins to feed the product over a large area to the aperture 3 of the telescopic pipe 1'. The tip 30 immediately works its way into the bulk material. Since it is not formed of a horizontally extending flat disc but is formed of upright flat section members, it has a loosening and centering action at the same time. The centering action can be imagined as similar to that of wood drills. The deeper the rotary plate 7 works into the bulk material, the greater does the resistance opposed to the rotary movement become. But the pivotable arms 20, or the blades 23 to be more precise, continually descend further into the bulk material and thus can take up very considerable reaction forces in the peripheral direction of the rotary plate 7. If, as shown by FIG. 1, the take-up head is applied against a sloping face of a pile of material and if it did not embody the present invention, the entire head would be driven or knocked away from the slope at the first substantial resistance encountered by the feed spirals. This is now effectively prevented by the tip 30. Before the take-up head encounters the bulk material the pneumatic suction fans (not shown here) are of course already switched on for producing a strong flow of conveying air into the pneumatic conveying pipe. The suction air provided for conveying purposes can, as is known, draw in the product only over a very restricted aspiration region.

It has been found that the cooperation of the feed spiral and the tip 30 keeps loosened-up bulk material ready in an easily flowing condition directly at the foresaid aspiration region. The feed spiral and the tip 30 thus assist the drawing of the bulk material into the pneumatic conveying pipe 1 in a very advantageous manner. The bulk material can be taken up uniformly with very high conveying throughflow rates and conveyed away so that the energy provided for the individual conveyors can be utilized in a more satisfactory manner than hitherto.

The take-up head can be lowered to any desired depth, for example to the bottom of bulk carrier barge. In order to prevent damaging the bottom of the barge it is possible to provide foot elements on the protective frame 5 which project beyond the tip 30 and on which the entire take-up head can rest. When the take-up head reaches the bottom of the boat, it can be drawn upwards with the telescopic pipe 1' and the pneumatic conveying pipe, and the operation can be repeated after moving the entire conveying unit laterally. The feed spiral need not lie on the bulk material over its entire area, since at least one, two or three pivotable arms 20 and the tip 30 can always be made to operate.

Figure 4:
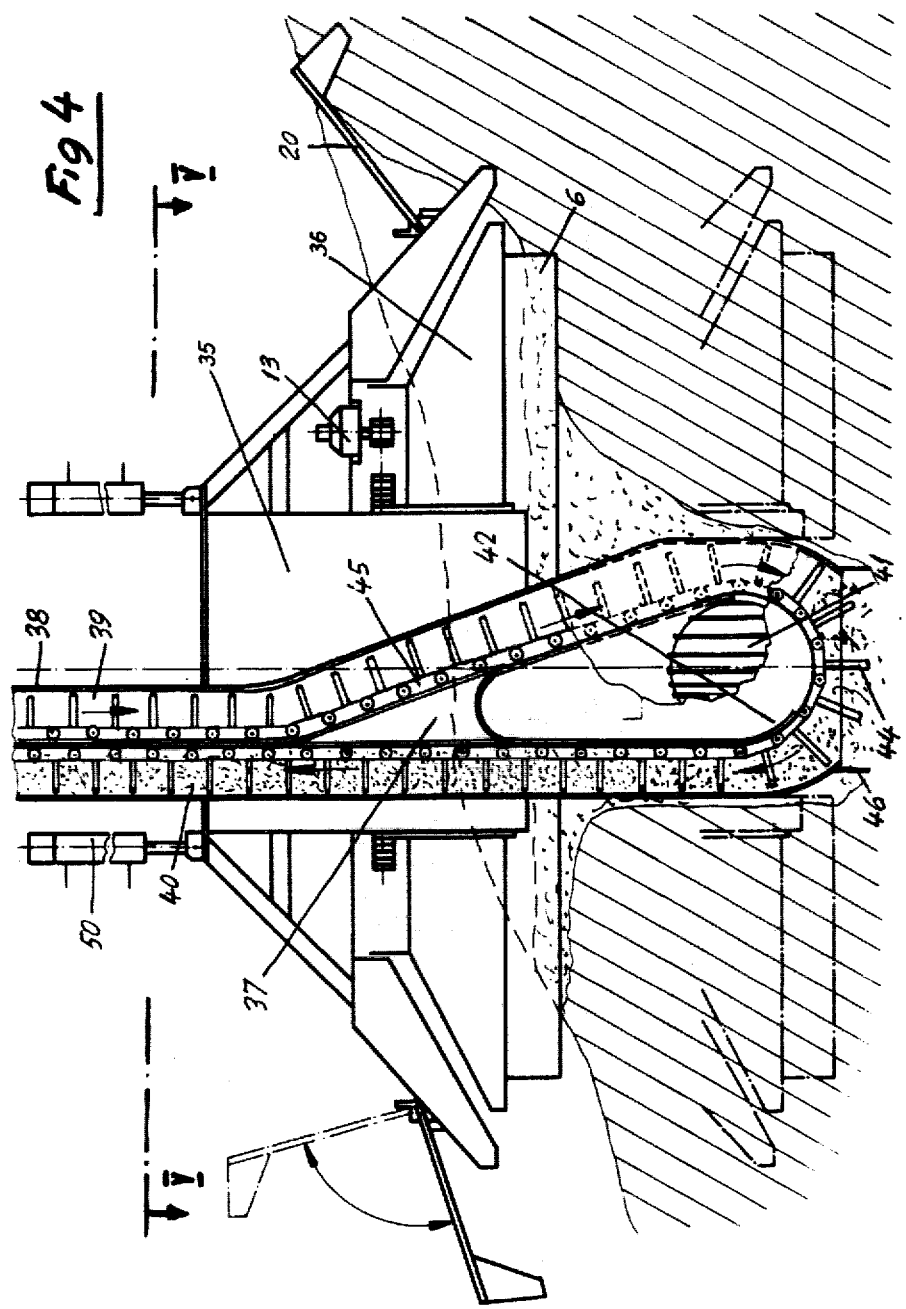
FIG. 4 shows in elevation and partly in section the take-up head with a chain conveyor of a second embodiment.
Figure 5:
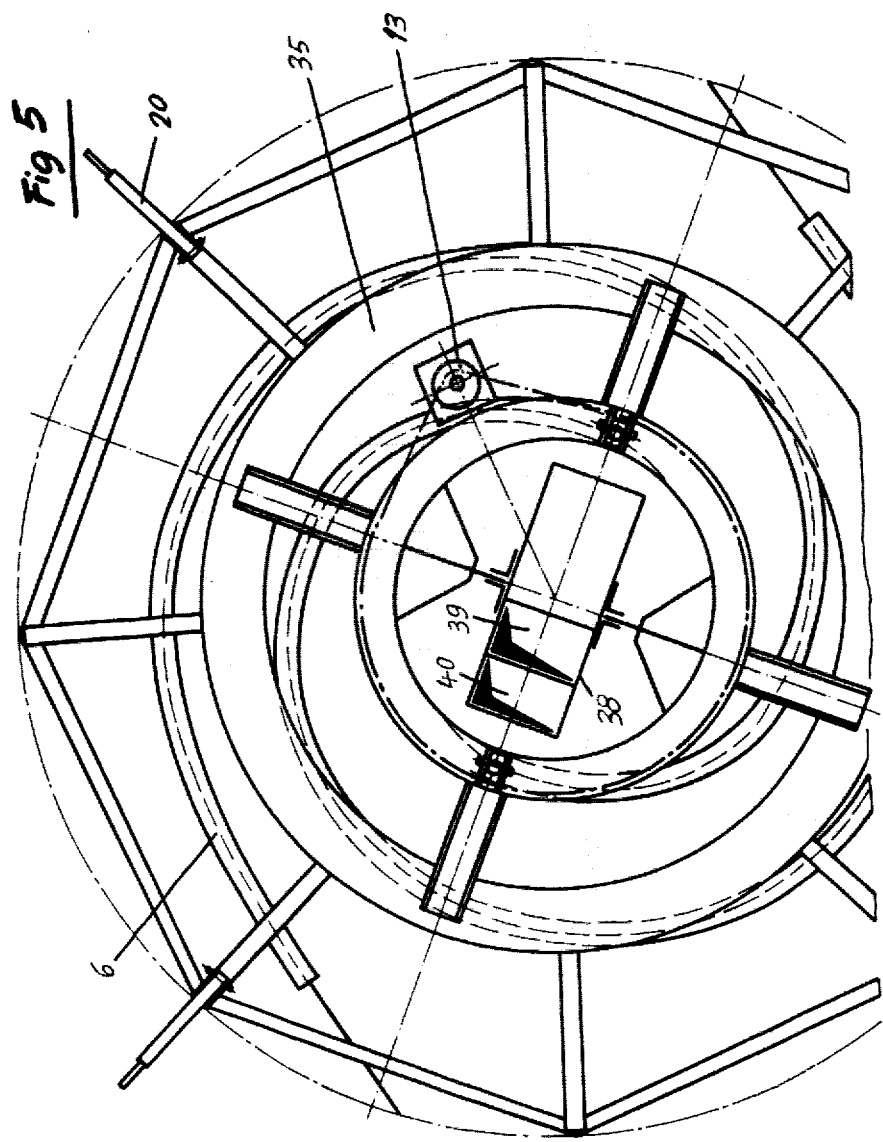
FIG. 5 is a section taken along the line V—V of FIG. 4.

FIGS. 4 and 5 show an embodiment of the invention with a take-up head 35 including a chain conveyor 38. The rotary plate 36 itself is identical in construction to that of FIG. 1 and some of its reference numerals have been adopted. In this embodiment, the entire rotary plate 36 is constructed so that it can be lifted and lowered with respect to the chain conveyor 38. The chain conveyor 38 comprises a take-up aperture 41 at each of the two sides of the lower portion of the take-up head 37. The chain conveyor 38 comprises two duct portions, a return duct 39 and the actual product conveying duct 40. The two duct portions are closed off from the outside. Below a reversal station 42 the take-up head 35 is open so that the individual cross-bars 44 of the conveying chain 45 project beyond the closed wall portions to the take-up head. The take-up head 37 has supports 46 at each corner which project a slight distance beyond the outermost points of the cross-bars 44, so that the bottoms of ships cannot be damaged by the cross-bars 44.

The rotary plate 36 can be lifted and lowered by two hydraulic cylinders 50. The control of the hydraulic cylinders 50 is not shown, but is effected in the usual way from a control desk or panel for the chain conveyor installation. Both hydraulic cylinders 50 are shown in their full length in FIG. 6. The entire rotary plate 36 together with the protective frame can be lifted or lowered by approximately half the height of the take-up head 37. The usual working position will correspond approximately to the full-line position. For further unloading of the residue or remnant of bulk material the rotary plate 7 can then be brought into the position shown in dot-dash lines. Depending on the characteristics of the product and the specific application concerned, the rotary plate 36 can be adjusted into any working position between the two extreme end positions.

FIG. 6 shows in a diagrammatic manner a complete ship unloading installation incorporating the take-up head of FIGS. 4 and 5. The terrace-like contours shown for the material being unloaded from the ship are intended to indicate that the bulk material is no longer in a flowable condition, so that it is necessary to loosen and break down the bedded material to be able to unload economically. The take-up head 35 is in direct contact with the bulk material and anchored therein as already explained. The movements of the ship are transmitted directly to the take-up head 35 and the chain conveyor 38. Between a conveyor 59 and the chain conveyor 38 a transfer joint 51 and a telescopic pipe 52 are arranged which can take up these movements. The chain conveyor 38 is held by means of a rope 53 which in its turn is held on a jib 54 of an unloading tower 55. The bulk material can be fed to land vehicles or the like or into storage means by way of a down pipe 56. The unloading tower 55 can travel at right angles to the plane of the drawing and the jib 54 can be lifted or lowered about a pivoting joint 56 as indicated in dot-dash lines. The movements of the ship disturb neither the construction of the unloading installation nor the working of the take-up head 37.

Operation is as follows.

The take-up head 37 is lowered by the jib 54 and the rope 53 onto the bulk material. In this first phase the rotary plate 36 is in its uppermost position relatively to the take-up head 37. The chain conveyor 38 is the first to contact the product and it digs into the product by means of its downwardly projecting cross-bars 44 constituting the hold member or tip in this case. The cross-bars 44 also dig into the consolidated bulk material as scraper elements. If the bulk material is tightly compacted, and fails to flow or slide to follow the digging action, then after the take-up head 37 has worked its way in approximately as far as the middle height of the take-up aperture 41, the rotary plate 36 is lowered onto the bulk material. The take-up head 37 is secured against swinging out of position laterally by the lowest part of the take-up head 37 which has already worked itself into the product. Since the pivotable arms 20 contact the product before the feed spiral, they can immediately prevent rotational movement of the take-up head 37. The rotary plate 36 is left in the position once selected for it relatively to the take-up aperture 41. The unit comprising chain conveyor 38 and rotary plate 36 is lowered into the product in accordance with the progressive digging-away of the bulk material. Only when the supports 46 strike against the bottom, for example of a barge, the rotary plate 36 is also lowered almost as far as the bottom. It is quite possible to arrange that the downwardly projecting cross-bars 44 of the chain conveyor 38 may be protected laterally and downwardly where appropriate by guard means to prevent direct contact with persons working in the hold, thus preventing accidents.

The arrangement and operation of the pivotable arms 20 is in accordance with the construction of FIG. 1. The main difference in the construction of FIGS. 4 and 5 is primarily the special construction of the tip 30, and also the possibility of displacing the entire rotary plate 7 together with the protective frame 5 relatively to the chain conveyor 38 and its take-up aperture 41.

In the constructional form shown in FIG. 1, it would be quite possible to displace the rotary plate relatively to the conveying pipe or the take-up aperture 3. But since the vertical displacement of the feed spiral 6 relatively to the take-up aperture 3 would mainly be for residual or remnant unloading rather than the main unloading operation, there would mostly be no point in providing for the rotary plate 7 to be displaced relatively to the pneumatic conveying pipe 1. In the chain conveyor 38, on the other hand, the displacement of the rotary plate 36 relatively to the aperture 41 follows from the general construction of the conveyor, more particularly the construction of the take-up head.

The drive of the rotary plate can be effected in various ways. It is possible to construct the drive motor 13 as an electric motor or as a hydraulic drive.

Figure 7:
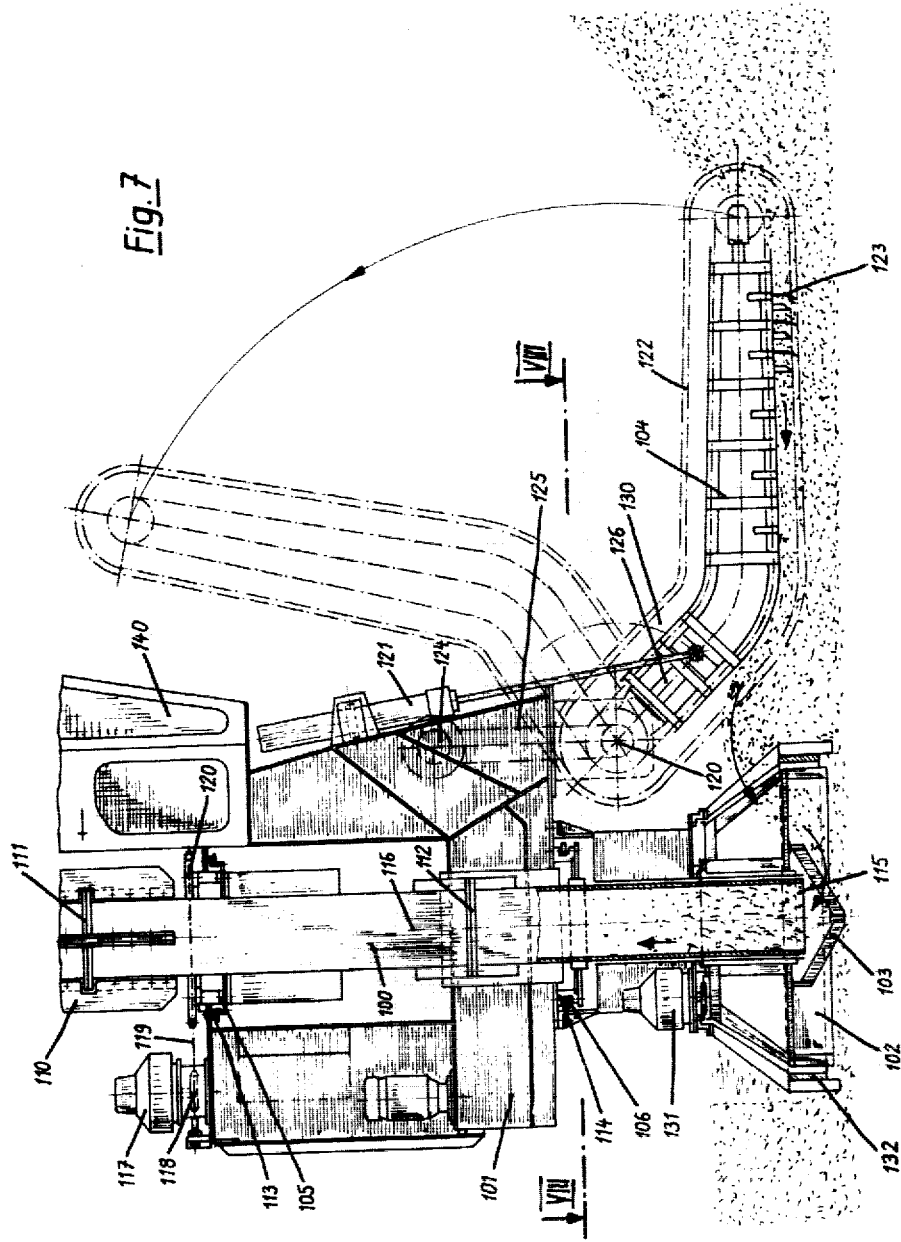
FIG. 7 shows a third embodiment with an auxiliary conveyor.

The third embodiment shown in FIGS. 7 and 8 comprises the following main groups. A pneumatic conveying pipe 100, a common frame 101, a rotary plate 102 with tip 103, an anchorage member in the form of an auxiliary conveyor 104, an upper main rotary bearing 105 and a lower main rotary bearing 106.

The arrangement for suspending the entire take-up head can be similar to those of the first and second embodiments, so that here again the entire unit is anchored in the bulk material.

The pneumatic conveying pipe 100 comprises in the uppermost portion reinforcing ribs 110 and also two flange connections 111 and 112. A race ring 113 of the upper main rotary bearing 105 and a race ring 114 of the lower main rotary bearing 106 are connected securely to the pneumatic conveying pipe 100.

The pneumatic conveying pipe 100 terminates below in a take-up suction aperture 115. The common frame 101 can be turned about the pneumatic conveying pipe 100 by means of the two main rotary bearings 105 and 106, so that the auxiliary conveyor which is pivotably connected to the common frame 101 can be swung through perhaps 360° about the vertical axis 116 of the pneumatic conveying pipe 100, as indicated in FIG. 8. The swinging movement is carried out by a drive motor 117 by way of a toothed wheel 118, a chain 119 and a toothed wheel 120.

The auxiliary conveyor is secured to be capable of being lifted and lowered by means of a horizontal pivotable joint 120 on the common frame 101. The lifting and lowering movements are carried out by a hydraulic cylinder 121 which is also arranged on the common frame 101, and is connected by control lines to a control desk.

The auxiliary conveyor 104 preferably comprises a conveying chain 122 with scraper blades 123 so that the bulk material can be loosened and conveyed. The conveying chain is driven by a motor 124 and drive chains 125. In addition to the necessary elements such as clamping devices 126, etc., the auxiliary conveyor 104 is formed with an angled structure as a special feature of it. In the horizontal working position, which is shown in full lines, the inner transfer end 130 is directed obliquely upwards in the region of the rotary blade 102. These arrangements result in a particularly advantageous method of operation since the bulk material is moved without unnecessary pressure, transverse displacements etc. directly into the working range of the feed spiral of the rotary plate 102. With good constructional arrangement of the entrainment elements of the rotary plate, for example in the form of logarithmic spirals, the bulk material can be conveyed from the place from where it is moved into the working region of the rotary plate over the shortest distance to the tip 103 and engaged there by conveying force while in the moved state, and transported away.

Mechanical loosening, conveying, acceleration and pneumatic transport can in this way supplement one another in the optimum manner.

It is not important at which region in the peripheral direction of the rotary plate 102 the auxiliary conveyor 104 delivers the bulk material, the conditions always being the same.

The feature of arranging the horizontal pivoting joint 120 or rather the inner transfer end 130 above the rotary plate 102 so that the bulk material is not pressed laterally against the rotary plate but lifted over, and conveyed from above into the working region of the rotary plate 102, has been found to be particularly advantageous.

It will be readily appreciated that on the one hand the rotary plate 102 with the tip 103 gives the auxiliary conveyor 104 the necessary hold against horizontal slipping away of the entire head, and on the other hand the auxiliary conveyor 104 gives the rotary plate 102 the necessary anchorage for preventing turning movement of the entire unit about the vertical axis 116.

The rotary plate can be constructed substantially in accordance with FIG. 1. In the illustrated construction a drive motor 131 is mounted on the common frame.

There is arranged about the feed spiral of the rotary plate 102 a holding ring 132 which takes up the constant large thrusting forces of the auxiliary conveyor in the lateral direction, and prevents rotary plate 102 working its way laterally. As can be seen from FIG. 7, the holding ring 132 does not extend along the entire height of the feed spiral, and need not necessarily be formed of a complete closed ring.

Since these are apparatus of great size and it is often necessary for the working operations to be controlled and supervised by a person, a control chain 140 can be secured on the common frame 101.

The constructions described above allow a very wide range of use, both in pneumatic conveying pipes and also chain conveyors, which can achieve reliable loosening and conveying away of bulk materials at a considerable delivery rate, by optimum cooperation of rotary plate and conveying element even in very difficult conditions with tightly compressed bulk materials and when working on sloping faces of material beds.

The advantageous method of operation is obtained as a result of the cooperation of the securing element with the preferably mechanically moved tip. The securing element prevents more particularly turning movements of the take-up head. The tip gives the take-up head guidance in the direction of the axis of rotation of the feed spiral, so that the conveying unit in general is prevented from swinging out laterally even under extreme conditions, and the bulk material can be loosened and fed to the suction nozzle in all cases.

The force required for loosening and taking up the bulk material can be completely received and absorbed by bulk material and take-up head cooperating with one another, the consolidated state of the bulk material being usefully employed, and the take-up head being anchored in the said material.

If the frame is constructed as an accident protection frame for the feed spiral, it normally does not carry out any rotary movement.

If upper and lower abutments for the pivotable arms are provided, then in the condition of rest the pivotable arms because of their own dead weight remain in the lower end position and contact the product when the take-up head is lowered before the feed spiral. The pivotable arms could also be held in the lowest position by spring force. It is expedient if the lower and upper positions of the pivotable arms are situated approximately symmetrically relatively to a horizontal straight line drawn through the pivoting point. When the take-up head is lowered, as a result, there is a slightly outwardly directed movement of the pivotable arms which therefore penetrate to an increased extent into the bulk material. On downward movement in the bulk material the pivoting arms move upwards relatively to the feed spiral. In the uppermost end position of the pivotable arms the outermost tips are again at a relatively small diameter relatively to the central position. The take-up head can penetrate downwards into the bulk material to an extent depending on the type of material removing technique selected. When the take-up head is taken out of the product the pivotable arms can be swung into the lowest end position and drawn upwards.

It is also very advantageous to construct the pivotable arms as blades at their outer ends. Thus they present very little resistance to the lifting and lowering of the take-up head, whereas they present the maximum possible effective surface against movement in the peripheral direction.

The outermost tips of the pivotable arms are to project in the outermost working position to the extent of at least 10–20% of the rotor diameter beyond the rotor.

When the mechanically moved tip is formed of upright elements, for example a projecting three-pronged tip, it works its way into the bulk material by a rotary movement and at the same time keeps ready in a loosened-up state the material introduced by the feed spiral.

Similarly when the mechanically moved tip is formed of chain elements guided about the reversal station they rapidly dig into the bulk material. The operation can be compared to the wheel of a motor car which is digging itself very quickly into snow and in the extreme case results in the unpleasant effect that the entire car is prevented from further horizontal movement.

Since the chain in chain conveyors is turned round through a relatively tight bend about the reversal station, there are only brief duration small horizontal forces which can be balanced already by the inertia of the take-up head.

After the feed signal encounters the bulk material, the speed at which the entire unit is lowered is determined substantially by the rotary plate, since it has a much larger bearing contact surface than the chain conveyor. The moved chain elements must ensure further conveyance of the bulk material and the penetration of the take-up head into the bulk material.

Therefore in the case of a chain conveyor the tip gives the take-up head a very strong centering or directing force preventing any swinging-out movements to the side.

In the construction that includes an auxiliary conveyor the individual conveying elements are balanced to a particularly good extent relatively to one another, which is very important more particularly in the case of a pneumatic conveying pipe.

A pneumatic conveying pipe is only capable of drawing in freely flowing bulk materials.

The auxiliary conveyor loosens the bulk material and guides it continuously to a region of an annular working area of the feed spiral, which conveys it, loosened up, directly to the reception aperture of the pneumatic conveying pipe. The auxiliary conveyor gives the feed spiral the necessary "grip" to prevent the unit from "turning in a circle". The thrust forces of the auxiliary conveyor are taken up by the feed spiral.

In this construction it has been found very advantageous to arrange about the feed spiral the preferably nonrotating lateral holding ring which is secured on the common frame. The holding ring laterally shields at least partly the said feed spiral so that a proportion of the considerable lateral thrust forces of the auxiliary conveyor are taken over by the holding ring. In this way, it is possible to prevent the feed spiral from working its way out of position towards the side. The continuously rotating feed spiral forms a circular hole when there is downward movement into the bulk material and without a downward movement the feed spiral takes bulk material from an annular area. This fact is utilized by arranging for the auxiliary conveyor to slightly lift the bulk material and feed it from above into the circular area operated on by the feed spiral. The auxiliary conveyor can in principle be turned through 360° in order to remove bulk material over a large circular area, and can transfer the bulk material to the feed spiral at any part of the circular ring area worked, without any change in the transfer conditions. A continuous flow of bulk material can be maintained from the auxiliary conveyor by way of the feed spiral into the pneumatic conveying pipe, so that the latter can be operated without interruption at a constant maximum output, the result of this being that high rates of delivery are possible while using small amounts of energy per unit conveyed. This solution also allows optimum suction conditions, the bulk material being accelerated mechanically directly into the take-up aperture of the pneumatic conveying pipe, and this again helps to keep the energy consumption of the entire unloading installation at an advantageous low level. Thus it becomes possible to use pneumatic unloading installations with little constructional outlay and, relative to purely mechanical unloading installations, with relatively low consumption of energy per unit with conveying rates of up to several 100 tons per hour. Here again the relative movements between ship and unloading installation can be taken up by simple telescopic parts or known joints. In this way no expensive control or antioverloading arrangements are required, such as are necessary with large mechanical installations.

What we claim is:

1. A bulk material take-up head comprising:
   (a) frame means including a substantially vertically disposed conveyor pipe adapted for connection to a source of suction and having a lower end terminating in a take-up aperture through which bulk material may be drawn;
   (b) rotary feeder means mounted on the frame means for rotation relative to the take-up aperture, the rotary feeder means being constructed and arranged to engage and feed bulk material inward to the take-up aperture;
   (c) drive means carried by the frame means for rotating the rotary feeder means;
   (d) at least one anchoring member carried by the frame means, at least part of which extends outwardly relative to the take-up aperture and which can be raised and lowered to engage the bulk material remote from the rotary feeder means to resist rotation of the frame means;
   (e) and centering tip means carried by the rotary feeder means and rotatable therewith, the centering tip means projecting axially downward below the rotary feeder means and in coaxial relation with the take-up aperture for engaging the underlying bulk material to resist lateral movement of the take-up head, the centering tip means defining a free space below the take-up aperture through which bulk material may be communicated to the take-up aperture.

2. The take-up head according to claim 1 wherein the rotary feeder means further comprises a plurality of spiral vanes extending spirally outward of its rotational axis and arranged for inward feed of material to the take-up aperture.

3. The tape-up head according to claim 2, wherein the rotary feeder means comprises three spiral vanes.

4. The take-up head according to claim 1, wherein the anchoring member extends radially with respect to the take-up aperture.

5. The take-up head according to claim 1, wherein the anchoring member is pivotally secured to the frame means so that it can be raised and lowered with respect thereto.

6. The take-up head according to claim 1 wherein the frame means comprises a guard frame protectively overlying the rotary feeder means and constructed to guard against accidental access to the rotary feeder means.

7. The take-up head according to claim 1, which comprises a plurality of said anchoring members, each of which comprises a radially extending arm pivotally attached to the frame means.

8. The take-up head according to claim 7, wherein each pivotal arm is pivotally extendable a distance equal to at least 1/10th the diameter of the rotary feeder means radially beyond the remainder of the head, and is pivotally retractable to a position of approximately the same radial extension as the rotary feeder means.

9. The take-up head according to claim 1, wherein said anchoring member has a blade at its remote end to facilitate anchorage in the bulk material.

10. The take-up head according to claim 1, wherein the centering tip means comprises a plurality of upright flat section members extending radially with respect to the rotational axis of the rotary feeder means.

11. The take-up head according to claim 10, wherein the lower edges of the flat section members are of saw tooth shape.

12. The take-up head defined by claim 10 which comprises three equiangularly disposed upright flat section members.

13. A method of taking up bulk material into a conveyor which includes the steps of:
   (a) lowering onto the bulk material a take-up head comprising frame means including a substantially vertically disposed conveying pipe connected to a source of suction and the lower end of which terminates in a take-up aperture;
   (b) rotating a feeder which is mounted to the frame means around the take-up aperture to cause the bulk material to be fed inwardly to the take-up aperture;
   (c) lowering an anchoring member carried by the frame means, at least part of which extends outwardly relative to the take-up aperture and which can be raised and lowered, to engage the bulk material remote from the rotary feeder means to resist rotation of the frame means;
   (d) and causing a centering tip which is part of the take-up head and which projects axially below the feeder and defines a free space therethrough, to engage the underlying bulk material to help hold the take-up head against lateral movement, and to communicate the bulk material through the free space to the take-up aperture.

14. The method according to claim 13 for unloading bulk material from the hold of a ship which includes the step of moving the take-up head laterally from time to time by appropriate movement of a land based jib from which the take-up head is suspended thereby to take up increasing parts of a layer of bulk material from the hold.

15. The method according to claim 13 which includes the step of lowering the take-up head further by appropriate movement with respect to a land based jib after the take-up head has taken up a layer of material and then causing it to take up a subjacent layer.

16. Apparatus for removing bulk material from the hold of a ship or the like comprising:
   (a) a take-up head adapted to be lowered into engagement with bulk material and constructed to take up the bulk material;

(b) support means for movably suspending the take-up head relative to the bulk material;
(c) and suction conveyor means cooperating with the take-up head for upwardly conveying bulk material taken up thereby;
(d) the take-up head comprising
  (i) frame means including a substantially vertically disposed conveyor pipe connected to the suction conveyor means and having a lower end terminating in a take-up aperture through which bulk material may be drawn;
  (ii) rotary feeder means mounted on the frame means for rotation relative to the take-up aperture, the rotary feeder means being constructed and arranged to engage and feed the bulk material inward to the take-up aperture;
  (iii) drive means carried by the frame means for rotating the rotary feeder means;
  (iv) at least one anchoring member carried by the frame means, at least part of which extends outwardly relative to the take-up aperture and which can be raised and lowered to engage the bulk material remote from the rotary feeder means to resist rotation of the frame means;
  (v) and centering tip means carried by the rotary feeder means and rotatable therewith, the centering tip means projecting axially downward below the rotary feeder means and in coaxial relation with the take-up aperture for engaging the underlying bulk material to resist lateral movement of the take-up head, the centering tip means defining a free space below the take-up aperture through which bulk material may be communicated to the take-up aperture.

17. The take-up head according to claim 16 which further comprises means associated with the take-up head for absorbing relative movement between the head and said support means.

* * * * *